United States Patent
Joshi et al.

(10) Patent No.: US 9,961,351 B2
(45) Date of Patent: May 1, 2018

(54) PALETTE MODE CODING

(71) Applicant: QUALCOMM Incorporated, San Diego, CA (US)

(72) Inventors: Rajan Laxman Joshi, San Diego, CA (US); Liwei Guo, San Diego, CA (US); Marta Karczewicz, San Diego, CA (US); Wei Pu, Pittsburgh, PA (US); Joel Sole Rojals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 14/952,438

(22) Filed: Nov. 25, 2015

(65) Prior Publication Data

US 2016/0150234 A1 May 26, 2016

Related U.S. Application Data

(60) Provisional application No. 62/085,168, filed on Nov. 26, 2014.

(51) Int. Cl.
*H04N 7/12* (2006.01)
*H04N 19/176* (2014.01)
*H04N 19/13* (2014.01)
*H04N 19/593* (2014.01)
*H04N 19/157* (2014.01)

(52) U.S. Cl.
CPC ........... *H04N 19/176* (2014.11); *H04N 19/13* (2014.11); *H04N 19/157* (2014.11); *H04N 19/593* (2014.11)

(58) Field of Classification Search
CPC .... H04N 19/176; H04N 19/13; H04N 19/147; H04N 19/593
USPC .............................................. 348/240–240.29
See application file for complete search history.

(56) References Cited

U.S. PATENT DOCUMENTS

| | | | |
|---|---|---|---|
| 2015/0016501 A1 | 1/2015 | Guo et al. | |
| 2016/0100174 A1* | 4/2016 | Yu | H04N 19/186 375/240.24 |
| 2016/0100179 A1* | 4/2016 | He | H04N 19/176 375/240.25 |
| 2016/0323584 A1* | 11/2016 | Chuang | H04N 19/56 |
| 2017/0171560 A1* | 6/2017 | Kim | H04N 19/593 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Farzana Hossain
(74) *Attorney, Agent, or Firm* — Shumaker & Sieffert, P.A.

(57) ABSTRACT

A device for decoding video data may be configured to determine a block of the video data is coded using a palette-based coding mode; determine a sample of the block of video data is coded using a copy from top mode or an index mode; and decode a greater than zero flag to indicate whether a run value is greater than zero, wherein the run value specifies a number of samples subsequent to the sample that have a same mode as the sample.

44 Claims, 8 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Flynn, et al., "High Efficiency Video Coding (HEVC) Range Extensions text specification: Draft 7," JCT-VC Meeting; Mar. 27-Apr. 4, 2014; (Joint Collaborative Team on Video Coding (JCT-VC) of ITU-T SG 16 WP 3 and ISO/IEC JTC 1/SC 29/WG 11); document No. JCTVC-Q1005_v4; Apr. 10, 2014; 379 pp.
Guo, et al., "Palette Mode for Screen Content Coding," JCT-VC Meeting; Apr. 18-16, 2013; (Joint Collaborative Team on Video Coding (JCT-VC) of ITU-T SG 16 WP 3 and ISO/IEC JTC 1/SC 29/WG 11); document No. JCTVC-M0323; Apr. 20, 2013; 5 pp.
Guo, et al. "RCE3: Results of Test 3.1 on Palette Mode for Screen Content Coding," JCT-VC Meeting; Jul. 25-Aug. 2, 2013; (Joint Collaborative Team on Video Coding (JCT-VC) of ITU-T SG 16 WP 3 and ISO/IEC JTC 1/SC 29/WG 11); document No. JCTVC-N0247, Jul. 16, 2013; 7 pp.
Guo, et al., "Non-RCE3: Modified Palette Mode for Screen Content Coding," JCT-VC Meeting; Jul. 25-Aug. 2, 2013; (Joint Collaborative Team on Video Coding (JCT-VC) of ITU-T SG 16 WP 3 and ISO/IEC JTC 1/SC 29/WG 11); document No. JCTVC-N0249, Jul. 16, 2013; 6 pp.
Guo, et al., "AHG8: Major-color-based screen content coding," JCT-VC Meeting; Oct. 23-Nov. 2013; (Joint collaborative Team on Video Coding (JCT-VC) of ITU-T SG 16 WP 3 and ISO/IEC JTC 1/SC 29/WG 11); document No. JCTVC-O0182, 33 pp.
Pu, et al., "Non-RCE4: Refinement of the Palette in RCE4 Test 2," JCT-VC Meeting; Jan. 9-17, 2014; (Joint collaborative Team on Video Coding (JCT-VC) of ITU-T SG 16 WP 3 and ISO/IEC JTC 1/SC 29/WG 11); document No. JCTVC-P0231, Jan. 12, 2014; 4 pp.
Guo, et al., "RCE4: Results of test 2 on Palette Mode for Screen Content Coding," JCT-VC Meeting; Jan. 9-17, 2014; (Joint Collaborative Team on Video Coding (JCT-VC) of ITU-T SG 16 WP 3 and ISO/IEC JTC 1/SC 29/WG 11); document No. JCTVC-P0198, Jan. 8, 2014; 13 pp.
Guo, et al., "RCE4: Results of Test 2 on Palette Mode for Screen Content Coding," JCT-VC Meeting; Jan. 9-17, 2014; (Joint Collaborative Team on Video Coding (JCT-VC) of ITU-T SG 16 WP 3 and ISO/IEC JTC 1/SC 29/WG 11); document No. JCTVC-P0198, 3 pp.

\* cited by examiner

Reference Palette

| Index | Pixel Value |
|---|---|
| 0 | $v_0$ |
| 1 | $v_1$ |
| 2 | $v_2$ |
| 3 | $v_3$ |
| 4 | $v_4$ |
| 5 | $v_5$ |

Current Palette

| Pred flag | Index | Pixel Value |
|---|---|---|
| 1 | 0 | $v_0$ |
| 0 | | |
| 1 | 1 | $v_2$ |
| 1 | 2 | $v_3$ |
| 1 | 3 | $v_4$ |
| 1 | 4 | $v_5$ |
| | 5 | $u_0$ |
| | 6 | $u_1$ |

FIG. 5

PALETTE MODE CODING

This application claims the benefit of U.S. Provisional Patent Application 62/085,168 filed 26 Nov. 2014, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

This disclosure describes techniques related to palette mode coding in a video encoding or video decoding process.

In one example, a method of decoding video data includes determining a block of the video data is coded using a palette-based coding mode; determining a sample of the block of video data is coded using a copy from top mode or an index mode; and decoding a greater than zero flag to indicate whether a run value is greater than zero, wherein the run value specifies a number of samples subsequent to the sample that have a same mode as the sample.

In another example, a method of encoding video data includes determining a block of the video data is coded using a palette-based coding mode; determining a sample of the block of video data is coded using a copy from top mode or an index mode; determining a number of samples subsequent to the sample that have a same mode as the sample; and generating, for inclusion in an encoded bitstream, a greater than zero flag to indicate whether a run value is greater than zero, wherein the run value indicates the number of samples subsequent to the sample that have the same mode as the sample.

In another example, a device for decoding video data includes a memory configured to store video data; and one or more processors configured to determine a block of the video data is coded using a palette-based coding mode; determine a sample of the block of video data is coded using a copy from top mode or an index mode; and decode a greater than zero flag to indicate whether a run value is greater than zero, wherein the run value specifies a number of samples subsequent to the sample that have a same mode as the sample.

In another example, a device for encoding video data includes a memory configured to store video data and one or more processors configured to determine a block of the video data is coded using a palette-based coding mode; determine a sample of the block of video data is coded using a copy from top mode or an index mode; determine a number of samples subsequent to the sample that have a same mode as the sample; and generate, for inclusion in an encoded bitstream, a greater than zero flag to indicate whether a run value is greater than zero, wherein the run value indicates the number of samples subsequent to the sample that have the same mode as the sample In another example, a computer readable storage medium stores instructions that when executed by one or more processors cause the one or more processors to determine a block of the video data is coded using a palette-based coding mode; determine a sample of the block of video data is coded using a copy from top mode or an index mode; and decode a greater than zero flag to indicate whether a run value is greater than zero, wherein the run value specifies a number of samples subsequent to the sample that have a same mode as the sample.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 5 illustrates an example of palette prediction, consistent with techniques of this disclosure.

DETAILED DESCRIPTION

Figure 1:
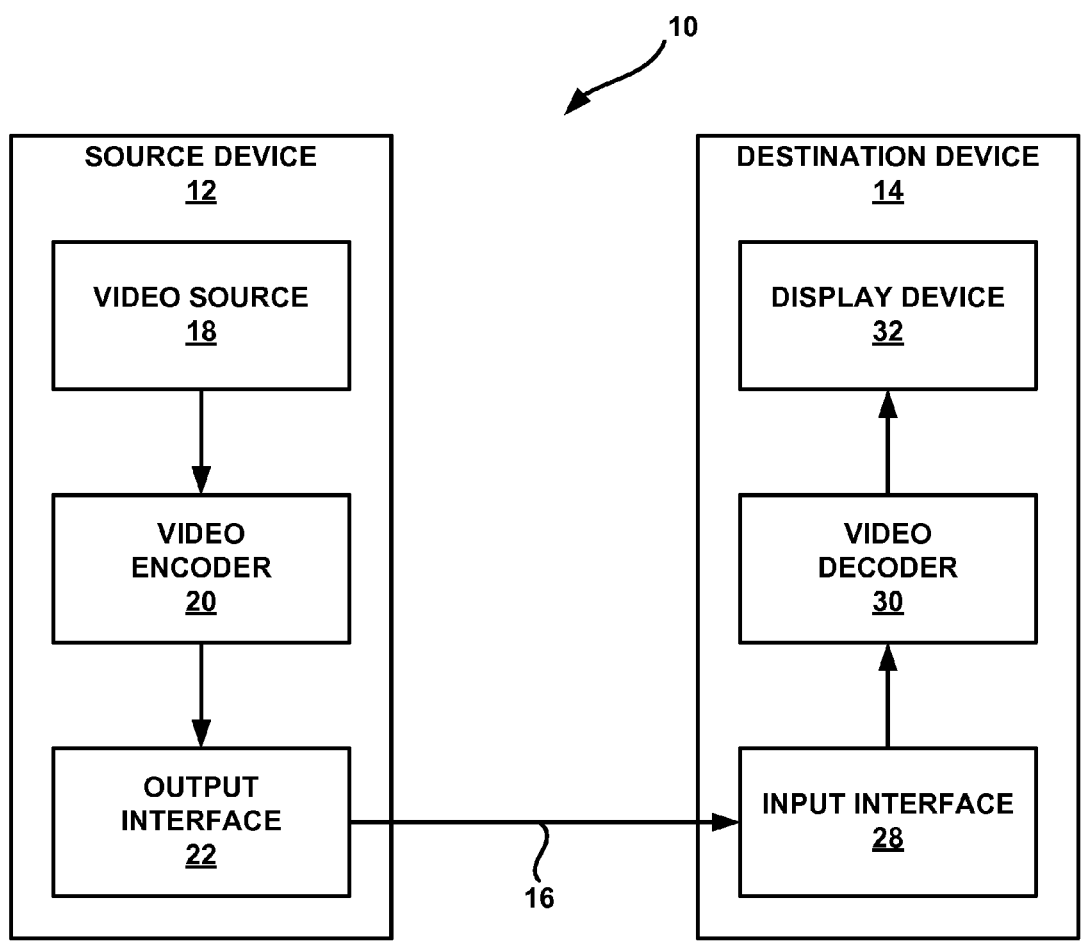
FIG. 1 is a block diagram illustrating an example video coding system that may utilize the techniques described in this disclosure.

This disclosure describes techniques for video coding (encoding and decoding) and compression. In particular, this disclosure describes techniques for palette-based coding of video data. In some examples, the palette-based coding techniques may be configured for use with one or more video coding standards implemented by video encoders and video decoders.

In traditional video coding, images are assumed to be natural images that are continuous-tone and spatially smooth. Based on these assumptions, various tools have been developed such as block-based transform, filtering, etc., and such tools have shown good performance for natural content videos. However, in applications like remote desktop, collaborative work, and wireless display, computer generated screen content may be the dominant content to be compressed. This type of content tends to have discrete-tone content, feature sharp lines, and have high contrast object boundaries. The assumption of continuous-tone and smoothness does not generally hold true for screen content, and thus, traditional video coding techniques may not compress the screen content as effectively as those coding tools compress natural content.

This disclosure describes palette-based coding tools, which may be particularly suitable for screen generated content coding. With a palette mode, for a particular area of video data that has a relatively small number of colors, a video coder (a video encoder or video decoder) may code a so-called "palette" as a table of colors for representing the video data of the particular area (e.g., a given block). Each pixel of the particular area may be associated with an entry in the palette that represents the color of the pixel. For example, the video coder may code an index that identifies the pixel value for the appropriate value in the palette. As described herein, a palette entry index may be referred to as a palette index or simply an index. Thus, in palette mode, a palette may include entries numbered by an index representing color component values that may be used as predictors for block samples or as final reconstructed block samples. Each entry in the palette may contain one color component (e.g., a luma value), two color components (e.g., two chroma values), or three color components (e.g., RGB, YUV, or the like), depending on the particular implementation being used. Certain examples in this disclosure may be provided with respect to pixels or with respect to samples. Unless explicitly stated otherwise, however, it should be understood that any technique described as being performed for a sample may also be performed for a pixel, and vice versa.

With respect to the HEVC framework, as an example, the palette-based coding techniques may be configured to be used as a coding unit (CU) mode. In other examples, the palette-based coding techniques may be configured to be used as a prediction (PU) mode in the framework of HEVC. Accordingly, all of the following disclosed processes described in the context of CUs may, additionally or alternatively, apply to PUs. However, these HEVC-based examples should not be considered a restriction or limitation of the palette-based coding techniques described herein, as such techniques may be applied to work independently or as part of other existing or yet to be developed systems/standards, including successor standards to HEVC. In such cases, the unit for palette coding may be square blocks, rectangular blocks, or even regions of non-rectangular shape.

Using a palette coding mode, a video encoder may encode a block of video data by determining a palette for the block, locating an entry in the palette to represent the value of each pixel, and encoding the palette with index values for the pixels relating the pixel value to the palette. A video decoder may obtain, from an encoded bitstream of video data, a palette for a block, as well as index values for the pixels of the block. The video decoder may relate the index values of the pixels to entries of the palette to reconstruct the pixel values of the block.

In palette coding, each sample in a block is coded with a particular palette mode. One such palette mode is "index" mode, which may also be referred to as a "value" mode or "copy from left" mode. In an index mode, a video decoder receives, for a current sample, an index value identifying an entry from the palette. The video decoder may also receive a run length, which specifies the number of subsequent samples in scanning order that share the same index, and hence share the same palette entry. The run length may be signaled by a non-negative value n−1 that indicates the run length, which means that the n samples, including the current sample, share the same index value. The reconstructed value for the current sample and the run of samples following the current sample is the sample value of the palette entry associated with the index value received for the current sample.

Another example palette mode is an "escape" mode. In escape mode, the sample values for the sample are not represented as a palette entry. Instead, the quantized sample values are signaled explicitly for the sample. In some instances, a predetermined index value may be signaled using, e.g., truncated binary code, to indicate that the current sample is coded in escape mode, followed by the quantized sample value. In some examples, the predetermined index may be equal to the maximum palette index plus one. For example, a palette index may initially be signaled. If the index is equal to the size of the palette, this indicates that the sample is an escape sample, e.g., a sample that is not included in the palette and that is instead coded in escape mode. In this case, the sample value or quantized samples value for each component is signaled. For example, if the palette size is 4, for non-escape samples, the palette indices are in the range [0, 3]. In this case, an index value of 4 signifies an escape sample. In the above-described implementation of escape mode, escape mode may be considered to be a special case of index mode. In other implementations, including implementations described below, however, escape mode may be signaled differently such that escape mode may be considered a mode wholly separate from index mode.

Another example mode may be a "copy from top" mode, which may also be referred to as a "copy from above" mode or "copy from above run" mode. In this mode, the palette entry index for the current sample is copied from the sample located directly above the current sample in a block. According to some aspects, only a syntax element specifying the length of the copy (e.g., run length) is signaled in the bitstream. For example, only a non-negative run length value m−1 may be transmitted to indicate that for the following m samples (including the current sample), palette indexes are the same as their neighbors directly above. Copy from top mode is different from index mode in the sense that the palette indices may be different within a run for the copy from top mode provided that the sample being coded matches the sample above.

Another palette coding mode may include a "copy previous row" mode. The copy previous row mode may operate similarly to the copy from top mode described above; however, the row from which indices are copied may be explicitly signaled. For example, the copy previous row mode enables pixels to be copied from previously coded rows beyond the row above the pixels currently being coded, as described in greater detail with respect to FIG. 7 below.

In the coding modes described above, a "run" of values may generally refer to a string of pixel values that are coded together. A run may generally be described with respect to the number of elements included in the run and that are processed or coded together as a group, e.g., the run length. In some examples, a run may include like-valued pixel values. For example, a run in the index mode may indicate a string of values having the same index value (as noted above). In an example for purposes of illustration, if two consecutive pixels in a given scan order have different values, the run length is equal to zero. If two consecutive pixels in a given scan order have the same value but the third pixel in the scan order has a different value, the run length is equal to one, and so on.

In other examples, as noted above, a run length in the copy from top mode may indicate a string of pixel values that share the same value as the above-neighboring pixels. Such pixels may also be processed or coded as a group in a run. In this example, the values within the run may be different, provided the sample value above the position being coded is the same as the current sample (e.g., if a current row has index values 1 2 2 2 4, and the row above the current row has index values 1 2 2 2 4, the run is 4).

The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC specification, referred to as HEVC Version 1, is available from http://www.itu.int/rec/T-REC-H.265-201304-I. The Range Extensions to HEVC, namely HEVC-Rext, are also being developed by the JCT-VC. A recent Working Draft (WD) of Range extensions, referred to as RExt WD7, is available from http://phenix.int-evry.fr/jct/doc_end_user/documents/17_Valencia/wg11/JCTVC-Q1005-v4.zip. Recently, JCT-VC has started the development of screen content coding (SCC), which is based on the HEVC-Rext. A working draft for screen content coding (SCC) is provided in "HEVC Screen Content Coding Draft Text 1," JCTVC-R1005, to Joshi et. al, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, and is available, as of Oct. 6, 2014, from http://phenix.int-evry.fr/jct/doc_end_user/current_document.php?id=9471.

In some examples, video encoder 20 and video decoder 30 operate according to a video compression standard, such as the HEVC standard mentioned above, and described in HEVC Version 1. In addition to the base HEVC standard, there are ongoing efforts to produce scalable video coding, multiview video coding, and 3D coding extensions for HEVC. In addition, palette-based coding modes, e.g., as described in this disclosure, may be provided for by extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In some examples, video encoder 20 may encode one or more syntax elements indicating a number of consecutive pixels in a given scan order that have the same pixel value. The string of like-valued pixel values may be referred to herein as a "run." In an example for purposes of illustration, if two consecutive pixels in a given scan order have different values, the run is equal to zero. If two consecutive pixels in a given scan order have the same value but the third pixel in the scan order has a different value, the run is equal to one. Video decoder 30 may obtain the syntax elements indicating a run from an encoded bitstream and use the data to determine the number of consecutive pixel locations that have the same index value.

In some examples, video encoder 20 and video decoder 30 may perform line copying for one or more entries of a map. For example, video encoder 20 may indicate that a pixel value for a particular entry in a map is equal to an entry in a line above the particular entry. Video encoder 20 may also indicate, as a run, the number of indices in the scan order that are equal to the entry in the line above of the particular entry. In this example, video encoder 20 and/or video decoder 30 may copy index values from the specified neighboring line and from the specified number of entries for the line of the map currently being coded.

According to aspects of this disclosure, video encoder 20 and video decoder 30 may perform any combination of the techniques for palette coding described below with respect to FIGS. 4-7.

As introduced above, the encoding and decoding of a palette generally consists of two parts. Video encoder 20 encodes the information for constructing the palette and then encodes the information indicating which entries from the palette are used for the pixels of a block. Video decoder 30 decodes the information for constructing the palette and then decodes the information identifying which entries from the palette are used for each pixel (or sample) to predict or reconstruct a block. Previous contributions (JCTVC-M0323, JCTVC-N0247, JCTVC-N0249, JCTVC-O0182, etc.), which are hereby incorporated by reference in their entirety, have proposed various ways of accomplishing these two tasks. This disclosure introduces new techniques for coding of the palette entries and indices.

According to one technique of this disclosure, for coding the palette entries, video encoder 20 may first encode a flag to indicate whether the current block uses the same palette as the palette for the last block that was coded in palette mode (referred to as the previous palette). Video decoder 30 receives the flag, and if the flag is 1 (true), then video decoder 30 copies all the palette entries from the previous block to the current palette. In some implementations, a predictor palette may be used instead of the previous palette. Video encoder 20 and video decoder 30 may, for example, determine the predictor palette based on the previous palette in conjunction with other information, such as palettes used prior to the previous palette.

If the flag is false, then for each entry in the previous palette, video decoder 30 may receive one bit to indicate whether that entry is copied to the current palette. The entry to be copied may be either a corresponding entry from the previous palette or a corresponding entry from a predictor palette that is not necessarily the same as the previous palette.

The number of entries from the previous palette that are copied to the current palette may be denoted as numPLTpredictedEntries. The maximum palette size for any block may be limited to a value denoted as MAX_PLT_SIZE. If numPLTpredictedEntries is less than MAX_PLT_SIZE, then new entries may be explicitly coded and included in the current palette. The new entries may be coded, for example, using a unary or truncated unary code. For truncated unary code, the maximum value for the new entries may be set to the value of (MAX_PLT_SIZE−numPLTpredictedEntries). In other implementations, the number of new entries may be coded using a different coding technique such as an exponential Golomb code of order 0.

Aspects of coding of palette indices will now be described. For purposes of explanation, it will be assumed that samples in a block are processed using horizontal raster scanning order, although the techniques of this disclosure are still applicable to other scans such as vertical raster scanning order. Each pixel in a block may be coded using one of the modes introduced above. In escape mode, the sample value is not included in the palette as a palette entry, and the sample value is signaled explicitly for each color component. Thus, for a sample coded in escape mode, video decoder 30 may receive additional signaling to indicate the sample value. The sample value may, for example, be quantized to improve compression. In copy from top mode, video decoder 30 may copy the palette entry index for the current sample from the sample located directly above in a block (or to the left for a vertical scan). In index mode, video decoder 30 may receive an index of the palette entry that is to be used for a particular sample.

According to techniques of this disclosure, for copy from top mode and index mode, a run value, also referred to simply as a run, may be signaled. The run specifies the number of subsequent samples that belong to the same mode. For example, if consecutive indices are 0, 2, 2, 2, 2, 5, then for the $2^{nd}$ sample, video decoder 30 may receive an indication that the sample is coded in an index mode. After receiving an indication that the index is equal to 2 in the example above, video decoder 30 may receive an indication that a run value is equal to three, signifying that the three subsequent samples also have the same index (an index of 2 in this example). Similarly, a run value of four following a copy from top mode means that a total of five indices are copied from the corresponding indices above.

According to the techniques of this disclosure, to indicate the mode, video encoder 20 may first signal an "escape flag" to indicate whether the sample is coded in escape mode. If the flag is 0 (false), then video encoder 20 may signal a second flag to indicate whether the sample is coded in a copy from top mode or an index mode. The second flag may be coded using CABAC with multiple contexts. The context may be derived according to the palette mode of the reference sample, for example, the left or above already coded samples. For example, if the reference sample mode is index mode, then a first context may be used, and if the reference sample mode is a copy from top mode, then a second context may be used. When the mode of the sample above is used for context derivation, for the first row of the block, a context value of 0 may be assigned. More generally, if the sample used for context derivation is outside the block (or CU or LCU), a fixed mode value (e.g. 0) may be assigned to such a sample or alternatively, a fixed context (e.g. 0) may be assigned to such samples. It may be possible to use a combination of the modes for the left sample and the sample above to determine the context.

The escape flag may be coded using CABAC with multiple contexts. For example, two contexts may be used depending on whether the escape flag for the sample above is 0 or 1. In other examples, the escape flag for the left sample may be used to determine the context instead. It may be possible to use a combination of the escape flag values for the left sample and the sample above to determine the context. The escape flag values for the left and/or above samples may be set to 0 when they are outside of the block, CU or LCU.

If the value of the escape flag is 1, another flag, escapePredictionFlag, may be transmitted to indicate whether the escape values for the color components are predicted. If the value of escapePredictionFlag is 1, the component escape values may be predicted from the reconstructed values of the pixel above. Other predictors such as the reconstructed sample to the left may be used as well. As described above, the prediction may be set to 0, if the predictor sample is outside of the block, CU or LCU. The difference between the predicted values and original values may be coded. If the escapePredictionFlag is 0, the component escape values may be directly coded. The binarization of the escape prediction residual or escape value may be dependent on the input bit-depth. The escape prediction residual or escape value may be further quantized.

According to other techniques of this disclosure, instead of an escape flag, an escape value may be coded as an index in the index mode. For example, if a palette includes M entries, with indices ranging from 0 to M−1, then an index value of M may be used to indicate that a sample is an escape sample. In such an example, video decoder 30 may determine that a sample is coded in an index mode and receive an index value. If the index value has a value of 0 to M−1, then video decoder may copy from the palette entries the sample value of the palette entry corresponding to the index value. If, however, video decoder 30 determines that the received index value is equal to M, then video decoder 30 may determine that the sample is an escape sample, in which case video decoder 30 receives additional information indicating the sample value.

According to other techniques of this disclosure, for copy from top mode and index mode, a run value may be coded. To encode the run value, video encoder 20 may perform the following steps:

First a "greater than 0" flag is encoded to indicate whether the run value is greater than 0. If the flag is 0, the run value is inferred to be 0.

If "greater than 0" flag is 1, a "greater than 1" flag is encoded to indicate whether the run value is greater than 1. If the flag is 0, the run value is inferred to be 1.

If "greater than 1" flag is 1, a "greater than 2" flag is encoded to indicate whether the run value is greater than 2. If the flag is 0, the run value is inferred to be 2.

If "greater than 2" flag is 1, run value minus 3 is encoded using a binarization similar to that used for coding "coeff_abs_level_remaining" syntax element is HEVC. In some implementations, a parameter of 3 for the Truncated Rice code may be used and may be kept constant.

Similarly, to decode the run value, video decoder 30 may perform the following steps:

First, a "greater than 0" flag is decoded to indicate whether the run value is greater than 0. If the flag is 0, the run value is inferred to be 0.

If "greater than 0" flag is 1, a "greater than 1" flag is decoded to indicate whether the run value is greater than 1. If the flag is 0, the run value is inferred to be 1.

If "greater than 1" flag is 1, a "greater than 2" flag is decoded to indicate whether the run value is greater than 2. If the flag is 0, the run value is inferred to be 2.

If "greater than 2" flag is 1, run value minus 3 is decoded using a binarization similar to that used for coding the "coeff_abs_level_remaining" syntax element in HEVC. In some implementations, a parameter of 3 for the Truncated Rice code may be used and may be kept constant.

The "greater than 0," "greater than 1" and "greater than 2" flags may be coded using CABAC with contexts. In some implementations, separate contexts may be used for runs corresponding to copy from top and index modes. Furthermore, a separate context is used for each of the flags. Although the above example shows the use of three flags, i.e., greater than 0, greater than 1, and greater than 2, it should be understood that more or fewer flags may be also used. For example, in some implementations, a greater than 3 flag may also be signaled, in which case a run value minus 4 may be coded in instances when the greater than 3 flag is true. In other implementations, only greater than 0 and greater than 1 flags are coded, in which case a run value minus 2 may be coded in instances when the greater than 2 flag is true.

For all the samples included in a run, the same mode may be assigned. For example, if a sample is coded in index mode with a run value of 5, then each of the 5 samples included in the run may be assigned index mode. The palette mode, the escape flag value, the escape prediction flag value and sometimes level value may be propagated through a group of samples belonging to the same run. As an example, assume that a sample is coded in index mode with an index value of 3 and assume the run value is 4. This means that the four subsequent samples are also assigned index mode with an index value of 3. As this group of five samples is not coded in escape mode, the escape flags and escape pixel prediction flags for those samples can be set to 0. This propagation may be used to code the next sample(s) by checking the palette mode of the previously coded sample. Similar propagation may be used for samples coded in a copy from top mode Other chroma formats will now be discussed. For 4:2:0 and 4:2:2 chroma formats, two different palettes may be used, one for the luminance component and the other one for the chrominance components (Cb and Cr, or U and V). Thus for luminance component, a palette entry consists of a single component (Y), whereas for the chrominance components, a palette entry consists of 2 components (Cb and Cr, or U and V). Even though separate palettes are used for luminance and chrominance, in some examples, a single palette mode flag may be used to indicate that both luminance and chrominance are coded using palette mode. Thus, in these examples it may not be possible that only one of luminance and chrominance uses palette mode, while the other component uses a different mode. In other examples, however, a separate palette mode flag may be signaled for luminance and chrominance components.

For the luminance component, the palette entries may be coded using the methods described above. This may be followed by coding of the palette indices for luminance samples in the block. Similarly, the palette entries and palette indices for the chrominance components may be coded using the methods described above. In other examples, the palette entries for the luminance and chrominance components may be coded followed by the coding of palette indices for the luminance and chrominance components. Only one set of indices is coded for the chrominance components. The palette index for chrominance is used to reconstruct both Cb and Cr (or U and V) samples.

In one example implementation, the coding of palette indices for luminance component and chrominance components is independent. This means that the mode, index and run information for the luminance samples is not used for coding of mode, index and run information for the chrominance samples. As described in U.S. patent application Ser. No. 14/328,502, filed 10 Jul. 2013, which is hereby incorporated by reference in its entirety, it may be possible to exploit the similarities in mode, index, and run information for the luminance samples and chrominance samples.

Figure 2:
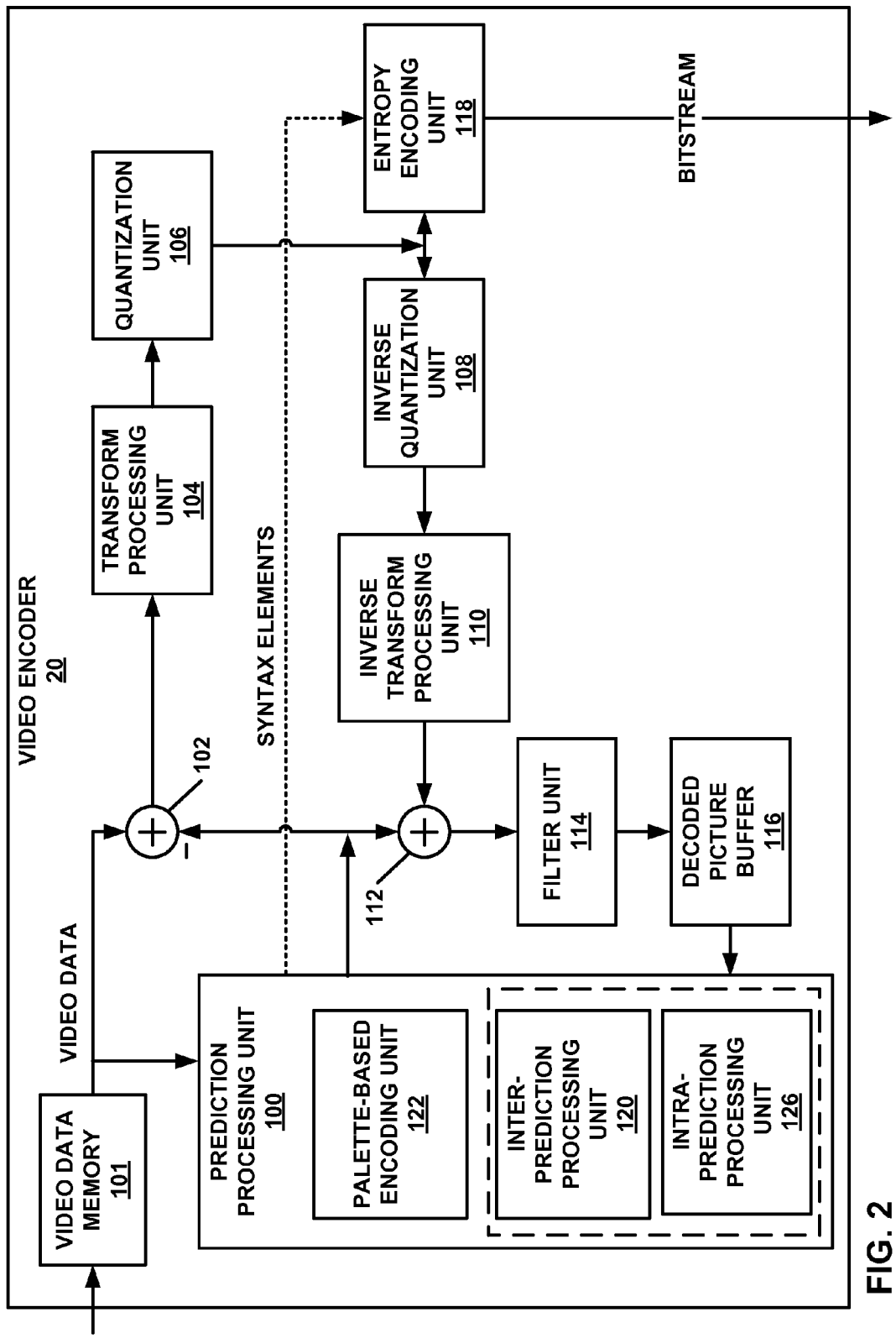
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Video encoder 20, in one example, may be configured to generate a palette having entries indicating pixel values, select pixel values in a palette to represent pixel values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit (not shown) and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described with respect to FIGS. 4-7 below.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
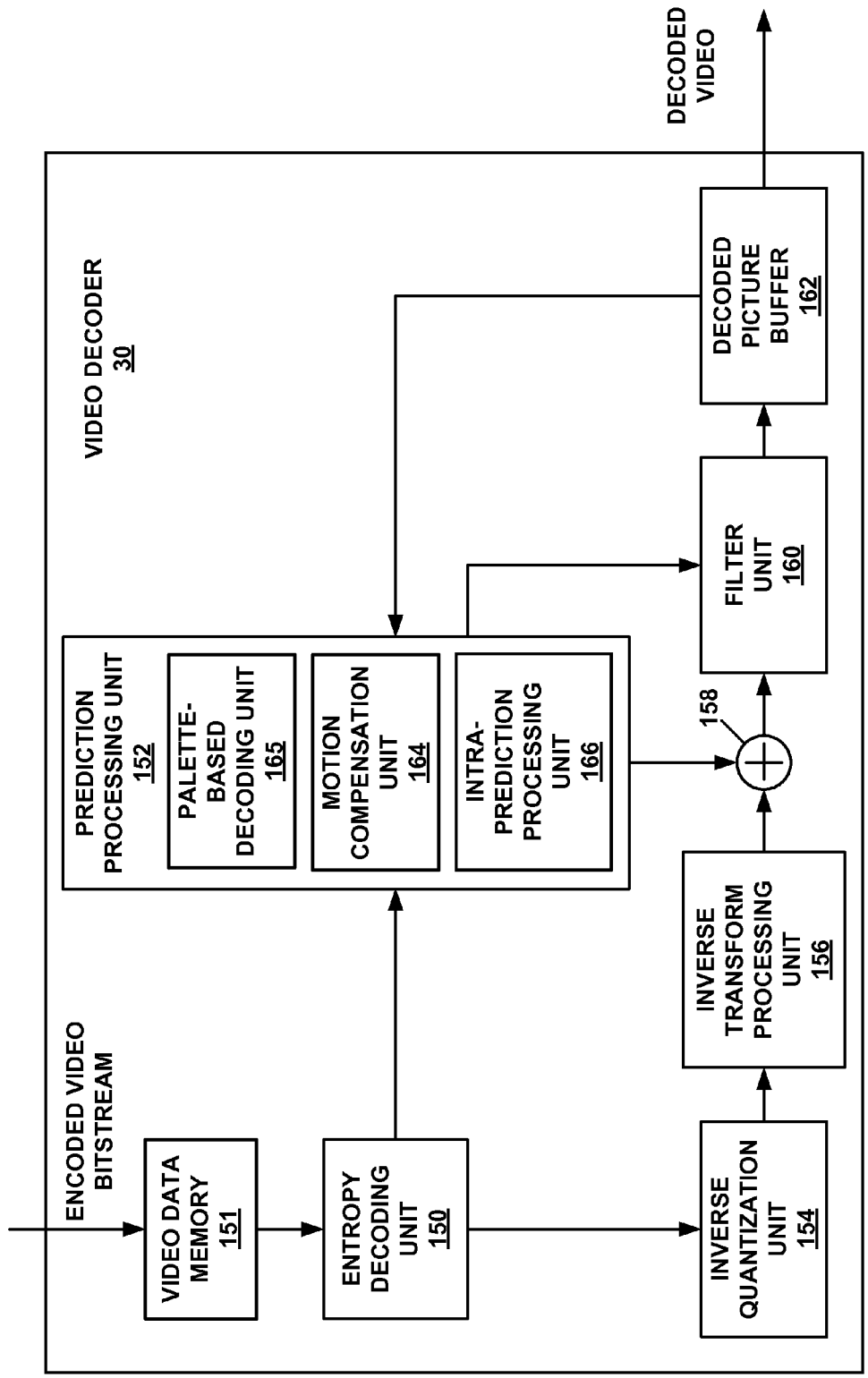
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as DRAM, including SDRAM, MRAM, RRAM, or other types of memory devices. Video data memory 151 and decoded picture buffer 162 may be provided by the same memory device or separate memory devices. In various examples, video data memory 151 may be on-chip with other components of video decoder 30, or off-chip relative to those components.

A CPB may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, prediction processing unit 152 decodes the block of video data using a non-palette based coding mode, e.g., such an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

According to aspects of this disclosure, palette-based decoding unit 165 may be configured to perform any combination of the techniques for palette coding described with respect to FIGS. 4-7 below.

Figure 4:
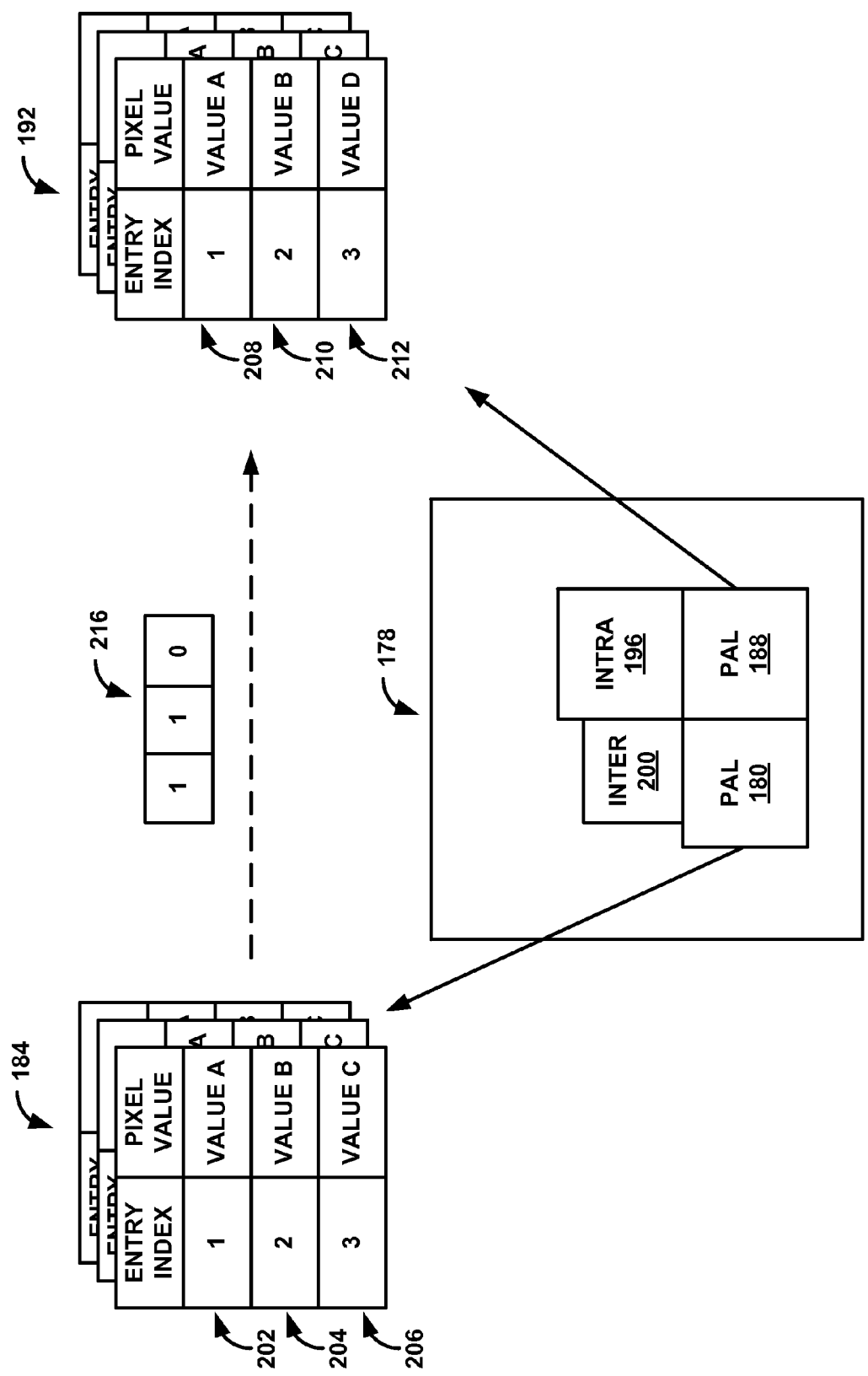
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. First CU 180 and second CU 188 are coded using a palette mode (PAL). As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

Based on the characteristics of screen content video, palette coding was introduced to improve SCC efficiency. Specifically, palette coding introduces a lookup table, i.e., color palette, to compress repetitive pixel values based on the fact that in SCC, colors within one CU usually concentrate on a few peak values. Given a palette for a specific CU, pixels within the CU are mapped to the palette index. In the second stage, a copy from left run length technique is proposed to effectively compress the index block's repetitive pattern. In later implementations of palette mode, the palette index coding mode was generalized to permit both index mode and copy from top mode to utilize run length coding. Note that, in some instances, no transformation process is invoked for palette coding to avoid blurring sharp edges which has a huge negative impact on visual quality of screen contents.

In general, the palette is a data structure which stores (index, pixel value) pairs. The designed palette may be decided at the encoder e.g., by the histogram of the pixel values in the current CU. For example, peak values in the histogram are added into the palette, while low frequency pixel values are not included into the palette.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, each of first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, one or more entries of a palette may be predicted from another palette (e.g., a palette previously used during coding). For example, a palette may include entries that are copied from a predictor palette. A predictor palette may include palette entries from blocks previously coded using palette mode or other reconstructed samples. For each entry in the predictor palette, a binary flag may be included in a bitstream to indicate whether that entry is copied to the current palette (indicated by flag=1). A series of binary flags for respective palette entries may be referred to as a binary palette prediction vector. Additionally, the current palette may include new entries signaled explicitly. The number of new entries may also be signaled.

In the example of FIG. 4, video encoder 20 and video decoder 30 may determine second palettes 192 based on first palettes 184. For example, video encoder 20 and/or video decoder 30 may locate one or more blocks from which the predictive palettes, in this example, first palettes 184, are determined. In some examples, such as the example illustrated in FIG. 4, video encoder 20 and/or video decoder 30 may locate the previously coded CU such as a left neighboring CU (first CU 180) when determining a predictive palette for second CU 188.

In the example of FIG. 4, second palettes 192 include three entries 208-212 having entry index value 1, entry index value 2, and entry index value 3, respectively. Entries 208-212 relate the index values to pixel values including pixel value A, pixel value B, and pixel value D, respectively. In this example, video encoder 20 may code one or more syntax elements indicating which entries of first palettes 184 are included in second palettes 192. In the example of FIG. 4, the one or more syntax elements are illustrated as a vector 216. Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 4, the vector is a Boolean vector.

In some examples, video encoder 20 and video decoder 30 may determine a palette predictor list (which may also be referred to as a palette predictor table) when performing palette prediction. The palette predictor list may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor list are to be included in a palette for coding a current block.

FIG. 5 illustrates an example of palette prediction, consistent with techniques of this disclosure. For example, for SCC, CU blocks within one slice may share many dominant colors. Therefore, as noted above with respect to FIG. 4, it may be possible to predict a current block's palette using a previous palette mode CUs' palettes (in CU decoding order) as reference. Specifically, a 0-1 binary vector may be signaled to indicate whether the pixel values in the reference palette are reused by the current palette or not. As an example, in FIG. 5, it is assumed that the reference palette has 6 items. A vector (1, 0, 1, 1, 1, 1) may be signaled with the current palette which indicates that $v_0$, $v_2$, $v_3$, $v_4$, and $v_5$ are re-used in the current palette while $v_1$ is not re-used. If the current palette contains colors which are not predictable from reference palette, the number of unpredicted colors is coded and then these colors may be directly signaled. For example, in FIG. 5, $u_0$ and $u_1$ may be directly signaled in the bitstream.

Figure 6:
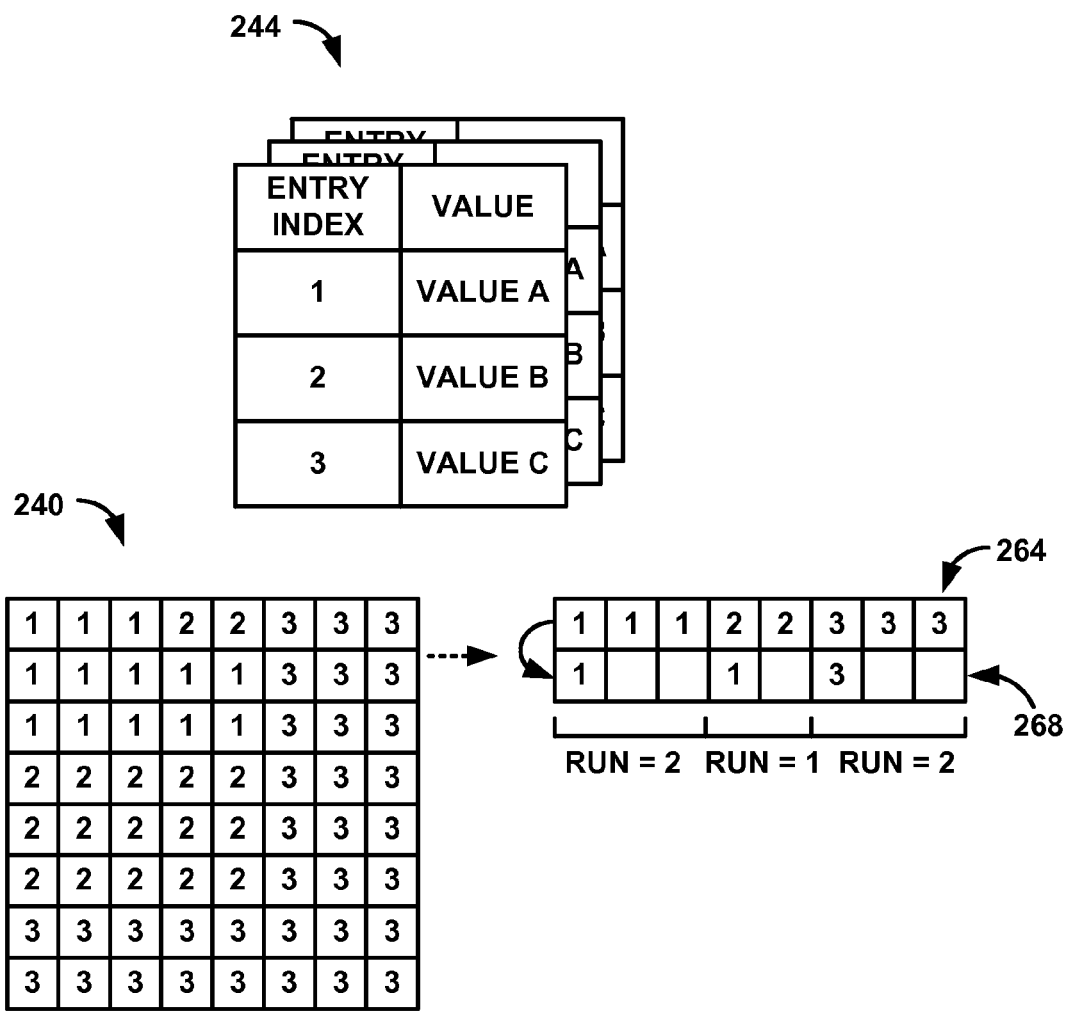
FIG. 6 is a conceptual diagram illustrating an example of determining indices to a palette for a block of pixels, consistent with techniques of this disclosure.

FIG. 6 is a conceptual diagram illustrating an example of determining indices to a palette for a block of pixels, consistent with techniques of this disclosure. For example, in the current HEVC Screen Content Coding Test Model 2 (SCM 2) reference software, the two primary aspects of palette coding, from a normative perspective, are the coding of the palette and the coding of the palette index for each sample in the block being coded in the palette mode. As noted above, the coding of palette indices may be performed using two primary modes, including index mode and copy from top mode. In the index mode, for example, a palette index may be initially signaled. If the index is equal to the size of the palette, this indicates that the sample is an escape sample. In this case, the sample value or quantized samples value for each component are signaled. In the copy from top mode, only a non-negative run length value m−1 may be transmitted to indicate that the current pixel and the following m−1 pixels share the same palette indices as their neighbors directly above, respectively.

In some examples, the palette mode for a particular block may be signaled using a palette_mode flag. As noted above, the index mode is also used to indicate escape samples, i.e., samples that do not belong to the palette. In the current design, a copy from top mode is not possible for the first row of the palette block. In addition, a copy from top mode may not follow another copy from top mode. In these cases, an index mode is inferred.

In some implementations of palette mode, the palette mode is signalled at a CU level, but it may be possible to signal it at a PU level. A flag, palette_esc_val_present_flag, may also be signaled to indicate the presence of escape samples in a current block. It is also possible to signal palette modes in a different manner. For example, in document JCTVC-P0231 (W. Pu, F. Zou, M. Karczewicz, and R. Joshi, "Non-RCE4: Refinement of the palette in RCE4 Test 2," JCTVC-P0231), the entire content of which is incorporated by reference herein, it was proposed to use an explicit flag to indicate whether the current sample was an escape sample. If the current sample was non-escape, another flag was signalled to indicate whether the palette mode was copy from top mode or index mode.

The example of FIG. 6 includes a map 240 of index values (values 1, 2, and 3) that relate respective positions of pixels associated with the index values to an entry of palettes 244. While map 240 is illustrated in the example of FIG. 6 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or index values in a given scan order that are coded as a group. The so-called "string" of values may be referred to as a run having a run length. For example, a run in the index mode may indicate a string of samples having the same palette index, and hence, the same reconstructed values. In another example, a run length in the copy from top mode may indicate a string of samples that share the same value as the above-neighboring pixels. Video decoder 30 may obtain the syntax elements indicating a run from an encoded bitstream and use the data to determine the number of consecutive locations that are coded together.

As noted above, runs may be used in conjunction with an index mode or a copy from top mode. In an example for purposes of illustration, consider rows 264 and 268 of map 240. Assuming a horizontal, left to right scan direction, row 264 includes three index values of "1," two index values of "2," and three index values of "3." Row 268 includes five index values of "1" and three index values of "3." In this example, video encoder 20 may identify particular entries of row 264 followed by a run when encoding data for row 268 (e.g., copy from top mode). For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

After encoding the one or more syntax elements indicating the first position of row 264 and the run of two entries (noted above), video encoder 20 may encode, for the fourth and fifth positions in line 268 (from left to right), one or more syntax elements indicating a value of 1 for the fourth position and one or more syntax elements indicating a run of 1 (e.g., index mode). Hence, video encoder 20 encodes these two positions without reference to another line.

Video encoder 20 may then encode the first position having an index value of 3 in row 268 relative to upper row 264 (e.g., indicating a copy from upper row 264 and the run of consecutive positions in the scan order having the same index value). Accordingly, video encoder 20 may select between coding pixel or index values of a line relative to other values of the line, e.g., using a run, coding pixel or index values of a line relative to values of another line (or column), or a combination thereof. Video encoder 20 may, in some examples, perform a rate/distortion optimization to make the selection.

Video decoder 30 may receive the syntax elements described above and reconstruct row 268. For example, video decoder 30 may obtain data indicating a particular location in a neighboring row from which to copy the associated index value for the position of map 240 currently being coded. Video decoder 30 may also obtain data indicating the number of consecutive positions in the scan order being processed as a group, e.g., in a run having a run length. While described with respect to a horizontal scan order, the techniques of this disclosure may also be applied to another scan direction, such as a vertical or diagonal (e.g., 45 degrees or 135 degrees diagonally in block) scan direction.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable. In addition, video encoding and video decoding may be generically referred to as "processing" video data.

Figure 7:
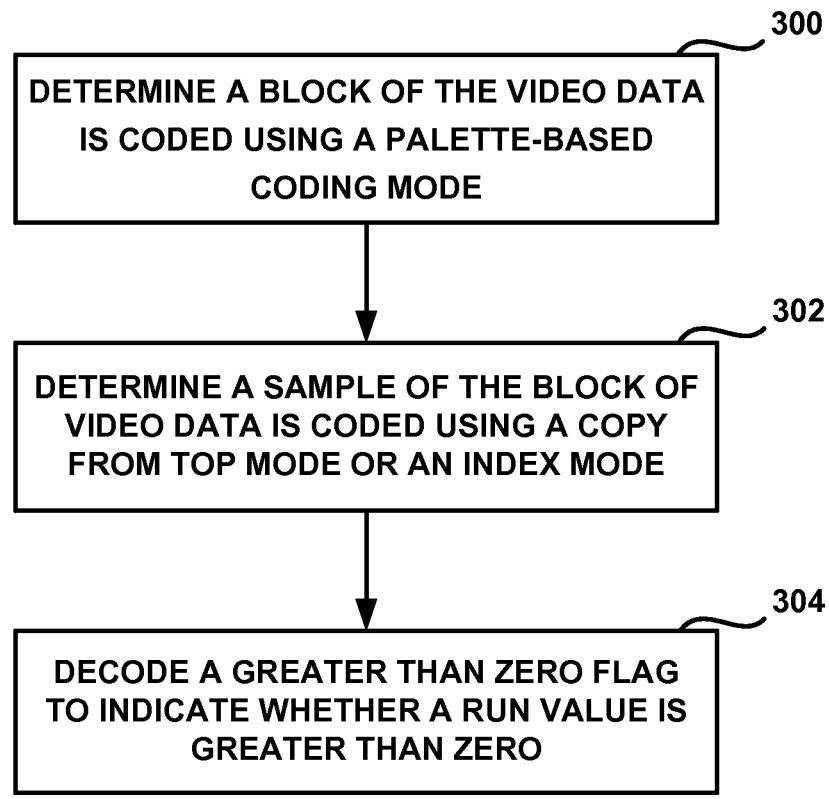
FIG. 7 is a flowchart illustrating a technique for palette mode decoding in accordance with the techniques of this disclosure.

FIG. 7 is a flowchart illustrating a technique for palette mode decoding in accordance with the techniques of this disclosure. The techniques of FIG. 7 may, for example, be performed by a video decoding device such as video decoder 30. In the example of FIG. 7, the video decoding device determines a block of video data is coded using a palette-based coding mode (300). The video coding device determines a sample of the block of video data is coded using a copy from top mode or an index mode (302). The video decoding device decodes a greater than zero flag to indicate whether a run value, specifying a number of samples subsequent to the sample that have a same mode as the sample, is greater than zero (304). The video decoding device may decode the block of video data based on the mode for the sample and the run value by, for example, by determining sample values for the sample and the number of samples subsequent to the sample that have the same mode as the sample. The video decoding device may then output, for display or for transmission to a display, a picture of decoded video data that includes the decoded block.

In response to the greater than zero flag indicating the run value is greater than zero, the video decoding device may decode a greater than one flag to indicate whether the run value is greater than one. In response to the greater than one flag indicating the run value is greater than one, the video decoding device may decode additional information to determine the run value. The additional information may, for example, include an indication of the run value minus 2. The video decoding device may decode the greater than zero flag and the greater than one flag using one or more contexts for a CABAC decoding operation. Each of the greater than zero flag and the greater than one flag may, for example, be decoded using a different context.

In some examples, when determining the sample of the block of video data is coded using the copy from top mode or the index mode, the video decoding device may determine the sample of the block of video data is coded using the index mode. In such cases, the run value may further specify the number of samples subsequent to the sample that have a same palette entry index value as the sample. In some examples, when determining the sample of the block of video data is coded using the copy from top mode or the index mode, the video coding device may determine the sample of the block of video data is coded using the copy from top mode. In such cases, the run value may further specify the number of samples subsequent to the sample that have a same palette entry index value as a corresponding sample from a line above.

Based on whether the sample of the block of video data is coded using the copy from top mode or the index mode, the video decoding device may select a context for a CABAC decoding operation for decoding the run value. The copy from top mode and the index mode may have different associated contexts.

To determine the sample of the block of video data is coded using the copy from top mode or the index mode, the video decoding device may receive a flag, with a value of the flag indicating one of the copy from top mode or the index mode. The flag may be entropy coded using CABAC. To determining the sample of the block of video data is coded using the copy from top mode or the index mode, the video decoding device may receive an escape mode flag indicating the sample is not coded in an escape mode.

Figure 8:
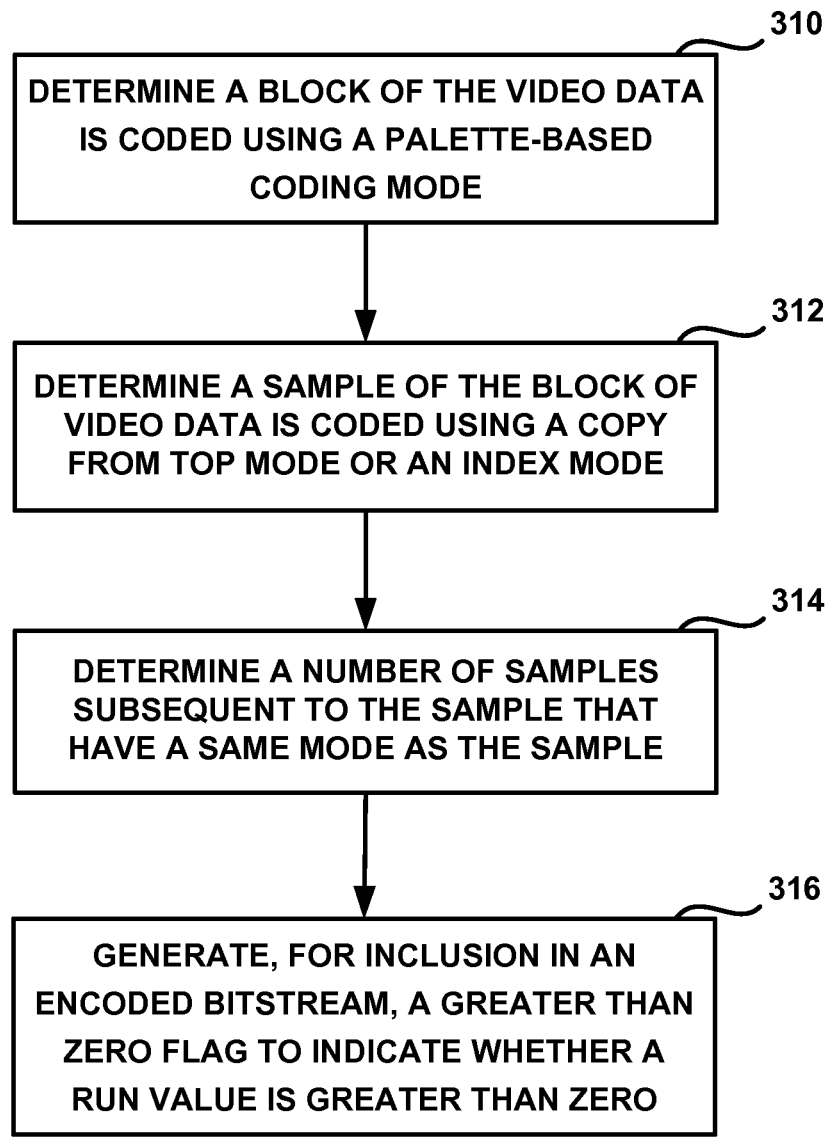
FIG. 8 is a flowchart illustrating a technique for palette mode encoding in accordance with the techniques of this disclosure.

FIG. 8 is a flowchart illustrating a technique for palette mode encoding in accordance with the techniques of this disclosure. The techniques of FIG. 8 may, for example, be performed by a video encoding device such as video encoder 20. In the example of FIG. 8, the video encoding device determines a block of the video data is coded using a palette-based coding mode (310). The video encoding device determines a sample of the block of video data is coded using a copy from top mode or an index mode (312). The video encoding device determines a number of samples subsequent to the sample that have a same mode as the sample (314). The video encoding device generates, for inclusion in an encoded bitstream, a greater than zero flag to indicate whether a run value is greater than zero (316). The run value indicates the number of samples subsequent to the sample that have the same mode as the sample. The video encoding device may then output the encoded bitstream. The video encoding device may output the encoded bitstream, for example, by transmitting the encoded bitstream to another device or by storing the encoded bitstream on a storage medium.

In response to the greater than zero flag indicating the run value is greater than zero, the video encoding device may generate, for inclusion in the encoded bitstream, a greater than one flag to indicate whether the run value is greater than one. In response to the greater than one flag indicating the run value is greater than one, the video encoding device may generate, for inclusion in the encoded bitstream, additional information to indicate the run value. The additional information may include an indication of the run value minus 2. The video encoding device may encode the greater than zero flag and the greater than one flag using one or more contexts for a CABAC operation. Each of the greater than zero flag and the greater than one flag may, for example, be encoded using a different context.

It should be understood that all of the techniques described herein may be used individually or in combination. This disclosure includes several signaling methods which may change depending on certain factors such as block size, palette size, slice type, etc. Such variation in signaling or inferring the syntax elements may be known to the encoder and decoder a-priori or may be signaled explicitly in the video parameter set (VPS), sequence parameter set (SPS), PPS, slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a block of the video data is coded using a palette-based coding mode;
   determining a sample of the block of video data is coded using a copy from top mode or an index mode;
   decoding a greater than zero flag to indicate whether a run value is greater than zero, wherein the run value specifies a number of samples subsequent to the sample that have a same mode as the sample;
   in response to the greater than zero flag indicating the run value is greater than zero, decoding a greater than one flag to indicate whether the run value is greater than one;
   in response to the greater than one flag indicating the run value is greater than one, decoding an indication of the run value minus 2;
   based on the indication of the run value minus 2, decoding the run value for the block of the video data; and
   outputting a decoded picture comprising the block of the video data.

2. The method of claim 1, further comprising:
   decoding the greater than zero flag and the greater than one flag using one or more contexts for a context-adaptive binary arithmetic coding (CABAC) decoding operation.

3. The method of claim 1, wherein determining the sample of the block of video data is coded using the copy from top mode or the index mode comprises determining the sample of the block of video data is coded using the index mode, and wherein the run value further specifies the number of samples subsequent to the sample that have a same palette entry index value as the sample.

4. The method of claim 1, wherein determining the sample of the block of video data is coded using the copy from top mode or the index mode comprises determining the sample of the block of video data is coded using the copy from top mode, and wherein the run value further specifies the number of samples subsequent to the sample that have a same palette entry index value as a corresponding sample from a line of other samples above a line comprising the sample.

5. The method of claim 1, further comprising:
   based on whether the sample of the block of video data is coded using the copy from top mode or the index mode, selecting a context for a context-adaptive binary arithmetic coding (CABAC) decoding operation for decoding the run value, wherein the copy from top mode and the index mode have different associated contexts.

6. The method claim 1, wherein determining the sample of the block of video data is coded using the copy from top mode or the index mode comprises:
   receiving a flag, wherein a value of the flag indicates one of the copy from top mode or the index mode.

7. The method of claim 6, wherein the flag is coded using context-adaptive binary arithmetic coding (CABAC).

8. The method of claim 6, wherein determining the sample of the block of video data is coded using the copy from top mode or the index mode comprises:
   receiving an escape mode flag indicating the sample is not coded in an escape mode.

9. The method of claim 1, further comprising:
   decoding the block of video data based on the mode for the sample and the run value; and
   outputting a picture of decoded video data that includes the decoded block.

10. The method of claim 1, further comprising:
    receiving the video data at a receiver of a wireless communication device;
    storing the video data in a memory of the wireless communication device; and
    processing the video data on one or more processors of the wireless communication device.

11. The method of claim 10, wherein the wireless communication device comprises a telephone handset and wherein receiving the video data at the receiver of the wireless communication device comprises demodulating, according to a wireless communication standard, a signal comprising the video data.

12. A method of encoding video data, the method comprising:
    determining a block of the video data is coded using a palette-based coding mode;
    determining a sample of the block of video data is coded using a copy from top mode or an index mode;
    determining a number of samples subsequent to the sample that have a same mode as the sample; and
    generating, for inclusion in an encoded bitstream, a greater than zero flag to indicate whether a run value is greater than zero, wherein the run value indicates the number of samples subsequent to the sample that have the same mode as the sample;
    in response to the greater than zero flag indicating the run value is greater than zero, generating, for inclusion in the encoded bitstream, a greater than one flag to indicate whether the run value is greater than one; and
    in response to the greater than one flag indicating the run value is greater than one, generating, for inclusion in the encoded bitstream, an indication of the run value minus 2; and
    outputting the encoded bitstream comprising the greater than zero flag, the greater than one flag, and the indication of the run value minus 2.

13. The method of claim 12, further comprising:
    encoding the greater than zero flag and the greater than one flag using one or more contexts for a context-adaptive binary arithmetic coding (CABAC) operation.

14. The method of claim 12, wherein determining the sample of the block of video data is coded using the copy from top mode or the index mode comprises determining the sample of the block of video data is coded using the index mode, and wherein the run value further specifies the number of samples subsequent to the sample that have a same palette entry index value as the sample.

15. The method of claim 12, wherein determining the sample of the block of video data is coded using the copy from top mode or the index mode comprises determining the sample of the block of video data is coded using the copy from top mode, and wherein the run value further specifies the number of samples subsequent to the sample that have a same palette entry index value as a corresponding sample from a line above.

16. The method of claim 12, further comprising:
    based on whether the sample of the block of video data is encoded using the copy from top mode or the index mode, selecting a context for a context-adaptive binary arithmetic coding (CABAC) decoding operation for decoding the run value, wherein the copy from top mode and the index mode have different associated contexts.

17. The method of claim 12, further comprising:
    generating, for inclusion in the encoded bitstream, a flag to indicate one of the copy from top mode or the index mode.

18. The method of claim 17, further comprising:
    encoding the flag using context-adaptive binary arithmetic coding (CABAC).

19. The method of claim 17, further comprising:
    generating, for inclusion in the encoded bitstream, an escape mode flag indicating the sample is not coded in an escape mode.

20. The method of claim 12, further comprising:
    storing the video data in a memory of a wireless communication device;
    processing the video data on one or more processors of the wireless communication device; and
    transmitting the video data from a transmitter of the wireless communication device.

21. The method of claim 20, wherein the wireless communication device comprises a telephone handset and wherein transmitting the video data at the transmitter of the wireless communication device comprises modulating, according to a wireless communication standard, a signal comprising the video data.

22. A device for decoding video data, the device comprising:
    a memory configured to store video data;
    one or more processors configured to:
        determine a block of the video data is coded using a palette-based coding mode;
        determine a sample of the block of video data is coded using a copy from top mode or an index mode;
        decode a greater than zero flag to indicate whether a run value is greater than zero, wherein the run value specifies a number of samples subsequent to the sample that have a same mode as the sample;
        in response to the greater than zero flag indicating the run value is greater than zero, decode a greater than one flag to indicate whether the run value is greater than one;
        in response to the greater than one flag indicating the run value is greater than one, decode an indication of the run value minus 2;
        based on the indication of the run value minus 2, decoding the run value for the block of the video data; and
        outputting a decoded picture comprising the block of the video data.

23. The device of claim 22, wherein the one or more processors are further configured to decode the greater than zero flag and the greater than one flag using one or more contexts for a context-adaptive binary arithmetic coding (CABAC) decoding operation.

24. The device of claim 22, wherein the one or more processors are further configured to, in response to determining the sample of the block of video data is coded using the index mode, determine that the run value further specifies the number of samples subsequent to the sample that have a same palette entry index value as the sample.

25. The device of claim 22, wherein the one or more processors are further configured to, in response to determining the sample of the block of video data is coded using the copy from top mode, determine that the run value further specifies the number of samples subsequent to the sample that have a same palette entry index value as a corresponding sample from a line above.

26. The device of claim 22, wherein the one or more processors are further configured to:
    based on whether the sample of the block of video data is coded using the copy from top mode or the index mode, select a context for a context-adaptive binary arithmetic coding (CABAC) decoding operation for decoding the run value, wherein the copy from top mode and the index mode have different associated contexts.

27. The device of claim 22, wherein to determine the sample of the block of video data is coded using the copy from top mode or the index mode, the one or more processors are further configured to receive a flag, wherein a value of the flag indicates one of the copy from top mode or the index mode.

28. The device of claim 27, wherein the flag is decoded using context-adaptive binary arithmetic coding (CABAC).

29. The device of claim 27, wherein to determine the sample of the block of video data is coded using the copy from top mode or the index mode, the one or more processors are further configured to receive an escape mode flag indicating the sample is not coded in an escape mode.

30. The device of claim 22, wherein the device further comprises a screen configured to display decoded video data.

31. The device of claim 22, wherein the device comprises a wireless communication device, further comprising a receiver configured to receive encoded video data.

32. The device of claim 31, wherein the wireless communication device comprises a telephone handset and wherein the receiver is configured to demodulate, according to a wireless communication standard, a signal comprising the encoded video data.

33. A device for encoding video data, the device comprising:
    a memory configured to store video data;
    one or more processors configured to:
        determine a block of the video data is coded using a palette-based coding mode;
        determine a sample of the block of video data is coded using a copy from top mode or an index mode;
        determine a number of samples subsequent to the sample that have a same mode as the sample;
        generate, for inclusion in an encoded bitstream, a greater than zero flag to indicate whether a run value is greater than zero, wherein the run value indicates the number of samples subsequent to the sample that have the same mode as the sample;
        in response to the greater than zero flag indicating the run value is greater than zero, generate, for inclusion in the encoded bitstream, a greater than one flag to indicate whether the run value is greater than one;
        in response to the greater than one flag indicating the run value is greater than one, generate, for inclusion in the encoded bitstream, an indication of the run value minus 2; and
        output the encoded bitstream comprising the greater than zero flag, the greater than one flag, and the indication of the run value minus 2.

34. The device of claim 33, wherein the one or more processors are configured to:
    encode the greater than zero flag and the greater than one flag are encoded using one or more contexts for a context-adaptive binary arithmetic coding (CABAC) operation.

35. The device of claim 33, wherein the sample of the block of video data is coded using the index mode, and wherein the run value further specifies the number of samples subsequent to the sample that have a same palette entry index value as the sample.

36. The device of claim 33, wherein the sample of the block of video data is coded using the copy from top mode, and wherein the run value further specifies the number of samples subsequent to the sample that have a same palette entry index value as a corresponding sample from a line above.

37. The device of claim 33, wherein the one or more processors are configured to:
    based on whether the sample of the block of video data is encoded using the copy from top mode or the index mode, select a context for a context-adaptive binary arithmetic coding (CABAC) decoding operation for decoding the run value, wherein the copy from top mode and the index mode have different associated contexts.

38. The device of claim 33, wherein the one or more processors are configured to:
    generate, for inclusion in the encoded bitstream, a flag to indicate one of the copy from top mode or the index mode.

39. The device of claim 38, wherein the one or more processors are configured to:
    encode the flag using context-adaptive binary arithmetic coding (CABAC).

40. The device of claim 38, wherein the one or more processors are configured to:
    generate, for inclusion in the encoded bitstream, an escape mode flag indicating the sample is not coded in an escape mode.

41. The device of claim 33, wherein the device further comprises a camera configured to capture the video data.

42. The device of claim 33, wherein the device comprises a wireless communication device, further comprising a transmitter configured to transmit encoded video data.

43. The device of claim 42, wherein the wireless communication device comprises a telephone handset and wherein the transmitter is configured to modulate, according to a wireless communication standard, a signal comprising the encoded video data.

44. A non-transitory computer readable storage medium storing instructions that when executed by one or more processors cause the one or more processors to:
    determine a block of the video data is coded using a palette-based coding mode;
    determine a sample of the block of video data is coded using a copy from top mode or an index mode;
    decode a greater than zero flag to indicate whether a run value is greater than zero, wherein the run value specifies a number of samples subsequent to the sample that have a same mode as the sample;
    decode a greater than one flag to indicate whether the run value is greater than one in response to the greater than zero flag indicating the run value is greater than zero; and
    decode an indication of the run value minus 2 in response to the greater than one flag indicating the run value is greater than one;
    based on the indication of the run value minus 2, decode the run value for the block of the video data; and
    output a decoded picture comprising the block of the video data.

* * * * *